(12) United States Patent
Weinberg et al.

(10) Patent No.: US 9,894,848 B2
(45) Date of Patent: Feb. 20, 2018

(54) STUMP CUTTER DISC WITH RECESSED TOOTH POCKETS

(71) Applicant: Vermeer Manufacturing Company, Pella, IA (US)

(72) Inventors: Clint Weinberg, Pella, IA (US); Louis C. Hartke, Otley, IA (US)

(73) Assignee: Vermeer Manufacturing Company, Pella, IA (US)

( * ) Notice: Subject to any disclaimer, the term of this patent is extended or adjusted under 35 U.S.C. 154(b) by 966 days.

(21) Appl. No.: 14/147,277

(22) Filed: Jan. 3, 2014

(65) Prior Publication Data

US 2014/0196818 A1 Jul. 17, 2014

Related U.S. Application Data

(60) Provisional application No. 61/751,705, filed on Jan. 11, 2013.

(51) Int. Cl.
*A01G 23/06* (2006.01)

(52) U.S. Cl.
CPC .................................. *A01G 23/067* (2013.01)

(58) Field of Classification Search
CPC ................................ A01G 23/067; A01G 23/06
See application file for complete search history.

(56) References Cited

U.S. PATENT DOCUMENTS

| 6,152,201 | A | 11/2000 | Kurelek |
| 7,216,682 | B1 * | 5/2007 | Bennington ......... A01G 23/067 144/228 |
| 7,418,986 | B2 * | 9/2008 | Watts ................... B02C 18/184 144/24.12 |
| 2005/0166997 | A1 | 8/2005 | Shinn |
| 2008/0149224 | A1 | 6/2008 | Kappel |
| 2008/0190519 | A1 | 8/2008 | Green |
| 2008/0196791 | A1 | 8/2008 | Gossett |
| 2008/0245440 | A1 | 10/2008 | Paumier |
| 2009/0031877 | A1 | 2/2009 | Gilbert et al. |

(Continued)

OTHER PUBLICATIONS

PCT/US2014/010869 International Search Report & Written Opinion dated Apr. 18, 2014, 12 pages.

(Continued)

*Primary Examiner* — Matthew G Katcoff
(74) *Attorney, Agent, or Firm* — Lathrop Gage L.L.P.

(57) ABSTRACT

One stump cutter cutting wheel disclosed herein includes a wheel structure having left and right sides and being rotatable about a central axis extending between the left and right sides. The left and right sides define receptacles having depths measured in an orientation extending along the axis. Cutter assemblies are mounted to the wheel structure and include cutters mounted to cutter holders. The cutter holders include base portions that fit within the receptacles, and the base portions each define at least one fastener opening. The base portions further define base thicknesses measured in the orientation extending along the axis. The receptacle depths are at least 0.25 times as large as the base thicknesses such that no more than 75 percent of the base thicknesses extend laterally outside the receptacles. Fasteners secure the cutter holders to the wheel structure and extend through the fastener openings defined by the base portions.

22 Claims, 5 Drawing Sheets

(56) References Cited

U.S. PATENT DOCUMENTS

| | | | |
|---|---|---|---|
| 2010/0043922 A1* | 2/2010 | Leonardi | A01G 23/067 144/235 |
| 2010/0218851 A1* | 9/2010 | Leonardi | A01G 23/067 144/235 |
| 2012/0024425 A1 | 2/2012 | Leonardi et al. | |

OTHER PUBLICATIONS

European Application No. 14737718.8, Extended European Search Report dated Aug. 19, 2016.
Canadian Application No. 2895556, Office Action dated Oct. 17, 2016.

* cited by examiner

STUMP CUTTER DISC WITH RECESSED TOOTH POCKETS

RELATED APPLICATIONS

This application claims priority to provisional application 61/751,705 filed Jan. 11, 2013 and titled "Stump Cutter Disc With Recessed Tooth Pockets", the disclosure of which is incorporated herein in its entirety by reference.

BACKGROUND

The present disclosure relates generally to material reduction machines that are adapted to be used to remove such items as tree stumps. Various methods and machines for removing or reducing the size of stumps are known. Examples of stump reduction machines are disclosed in U.S. Pat. No. 6,014,996 titled Control System for Stump Cutters assigned to Vermeer; U.S. Pat. No. 7,011,124 titled Stump Grinder Having Automatic Reversing Feed Assembly assigned to Tramo; U.S. Pat. No. 6,026,781 titled Stump Cutter Safety System assigned to Rayco; and U.S. Pat. No. 6,230,770 titled Stump Chipper and Method for the Operation Thereof assigned to Vermeer-Holland.

SUMMARY

In one embodiment of the current invention, a stump cutter cutting wheel includes a wheel structure having a left side and a right side. The wheel structure can be rotatable about a central axis that extends through the wheel structure between the left and right sides. The left and right sides of the wheel structure define multiple receptacles that have receptacle depths measured in an orientation that extends along the central axis. Multiple cutter assemblies can be mounted to the wheel structure. The cutter assemblies include cutters mounted to cutter holders. The cutter holders include base portions that fit within the receptacles and the base portions each define at least one fastener opening. The base portions define base thicknesses measured in the orientation that extend along the central axis. The receptacle depths can be at least 0.25 times as large as the base thicknesses such that no more than 75 percent of the base thicknesses extend laterally outside of the receptacles. The stump cutter cutting wheel includes fasteners for securing the cutter holders to the wheel structure. The fasteners extend through the fastener openings defined by the base portions of the cutter holders.

Another aspect of the disclosure includes a stump cutter cutting wheel including a main wheel that has a left side and a right side. The main wheel can be rotatable about a central axis that extends through the main wheel between the left and right surfaces. Guard structures can be mounted to the left and right surfaces of the main wheel. The guard structures are formed by plates fastened to the main wheel. The plates define openings that define receptacles and the receptacles have inner and outer ends. The receptacles have depths that extend from the inner ends to the outer ends of the receptacles. The depths can be measured in an orientation that extends along the central axis of the main wheel. The inner ends are closed by the left and right surfaces of the main wheel and outer ends being open. The stump cutter cutting wheel includes multiple cutter assemblies including cutters mounted to cutter holders. The cutter holders include base portions that fit within the receptacles and the base portions each define at least one fastener opening. The stump cutter cutting wheel includes fasteners for securing the cutter holders to the main wheel. The fasteners extend through the fastener openings defined by the base portions of the cutter holders and engage the main wheel.

A further aspect of the disclosure includes a stump cutter cutting wheel including a wheel structure that has a left side and a right side. The wheel structure can be rotatable about a central axis that extends through the wheel structure between the left and right sides. The left and right sides of the wheel structure define multiple receptacles that have receptacle depths measured in an orientation that extends along the central axis. The stump cutter cutting wheel includes multiple cutter assemblies mounted to the wheel structure. The cutter assemblies include cutters mounted to cutter holders and the cutter holders include base portions that fit within the receptacles. The base portions each define at least one fastener opening. The stump cutter cutting wheel includes fasteners for securing the cutter holders to the wheel structure. The fasteners extend through the fastener openings defined by the base portions of the cutter holders. The receptacles define receptacle outlines and the base portions define base portion outlines. A majority of each receptacle outline has a clearance of at least 0.2 inches with respect to the base portion outline of a corresponding one of the base portions.

Another aspect of the disclosure relates to a design that reduces the amount of debris thrown from the wheel structure while cutting assemblies cut and grind, for example, a tree stump.

DETAILED DESCRIPTION

Figure 1:
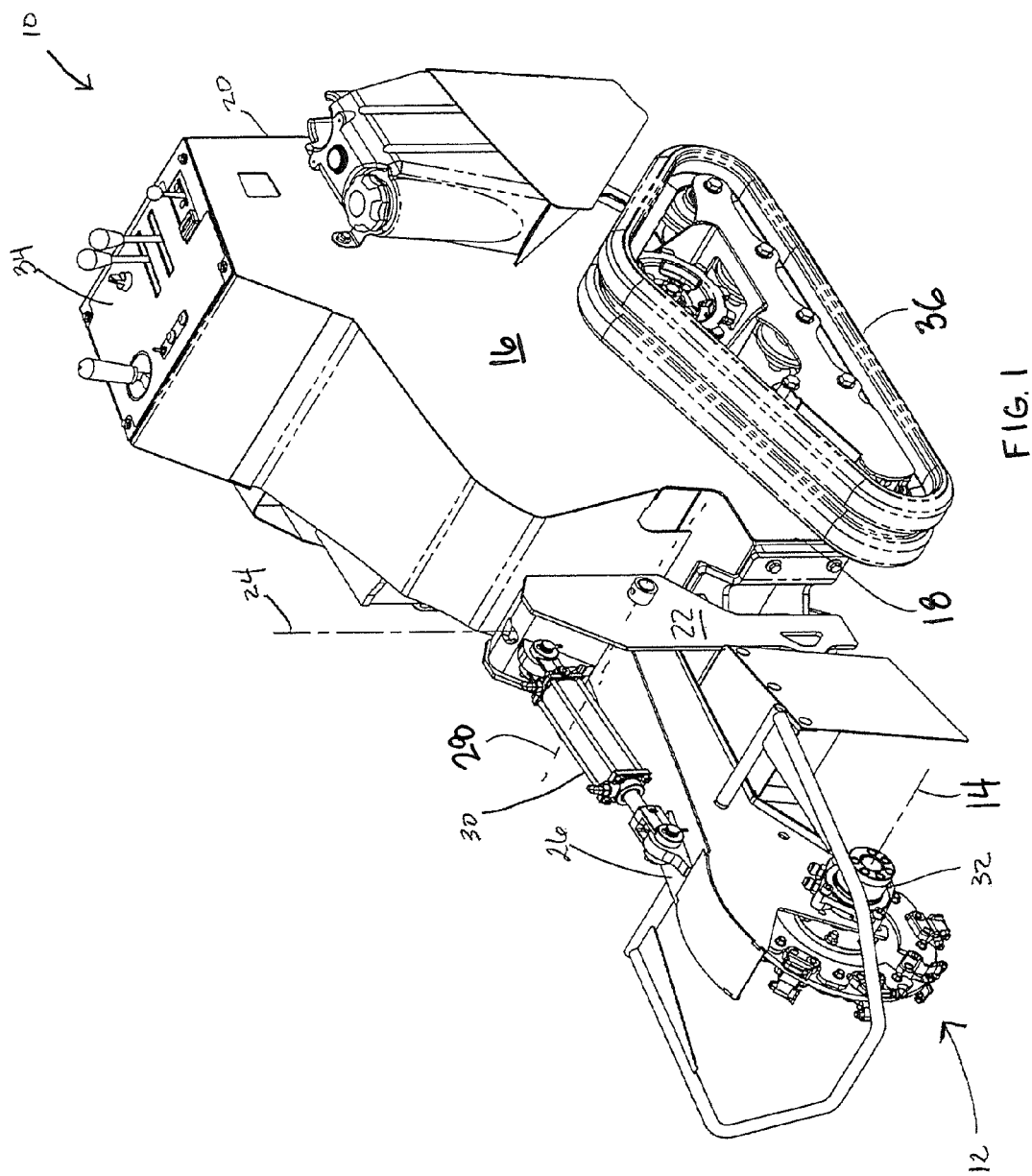
FIG. 1 is perspective view of a self-propelled stump cutter incorporating a stump cutter cutting wheel in accordance with the principles of the present disclosure.

An exemplary embodiment will be described in detail with reference to the drawings, wherein like reference numerals represent like parts and assemblies throughout the several views. Reference to the embodiment does not limit the scope of the claims attached hereto. Additionally, any examples set forth in this specification are not intended to be limiting and merely set forth some of the many possible embodiments for the inventive aspect disclosed herein.

The present disclosure relates generally to a stump cutter for improved operation below ground where tooth mount pockets are mounted such that they are recessed into the stump cutter disc. In one example, the pockets are mounted so that they are recessed into the stump cutter disc such that the outer surface of the pocket is approximately co-planar with the outside surface of the stump cutter disc. The stump cutter reduces drag on the stump cutter wheel when it is submerged, either in the ground or in chips of wood. The stump cutter also reduces the tendency for the stump cutter wheel to throw material.

FIG. 1 illustrates perspective view of a self-propelled (i.e. walk-behind) stump cutter 10 having a stump cutter cutting wheel 12 on the front thereof which rotates about a substantially horizontal axis 14 as it sweeps in contact with, for example, a tree stump. The stump cutter 10 includes a chassis 16 (i.e., a mainframe) including a first end 18 and a second end 20. A sub frame 22 attaches to the chassis 16 at a swing axis 24. The sub frame 22 sweeps or pivots along swing axis 24, which is substantially vertical, toward a stump to be grounded. The stump cutter 10 includes a boom 26 that attaches to the sub frame 22 at pivot axis 28. A lift cylinder 30 pivotally connected to the sub frame 22 enable the boom 26 to pivot relative to the chassis 16 about a pivot axis 28. The lift cylinder 30 can be a hydraulic cylinder arranged to raise and lower the boom 26. A drive motor 32 is located on a side of the boom 26 to drive the stump cutter cutting wheel 12. The stump cutter 10 includes a control panel 34 mounted to the chassis 16 such that it can be positioned at the second end 20 of the chassis 16. The stump cutter 10 includes a propulsion structure 36 (i.e. wheel, rubber track, steel track etc.) that can be mounted on the chassis 16 to move the stump cutter 10 across a floor or ground.

Figure 2:
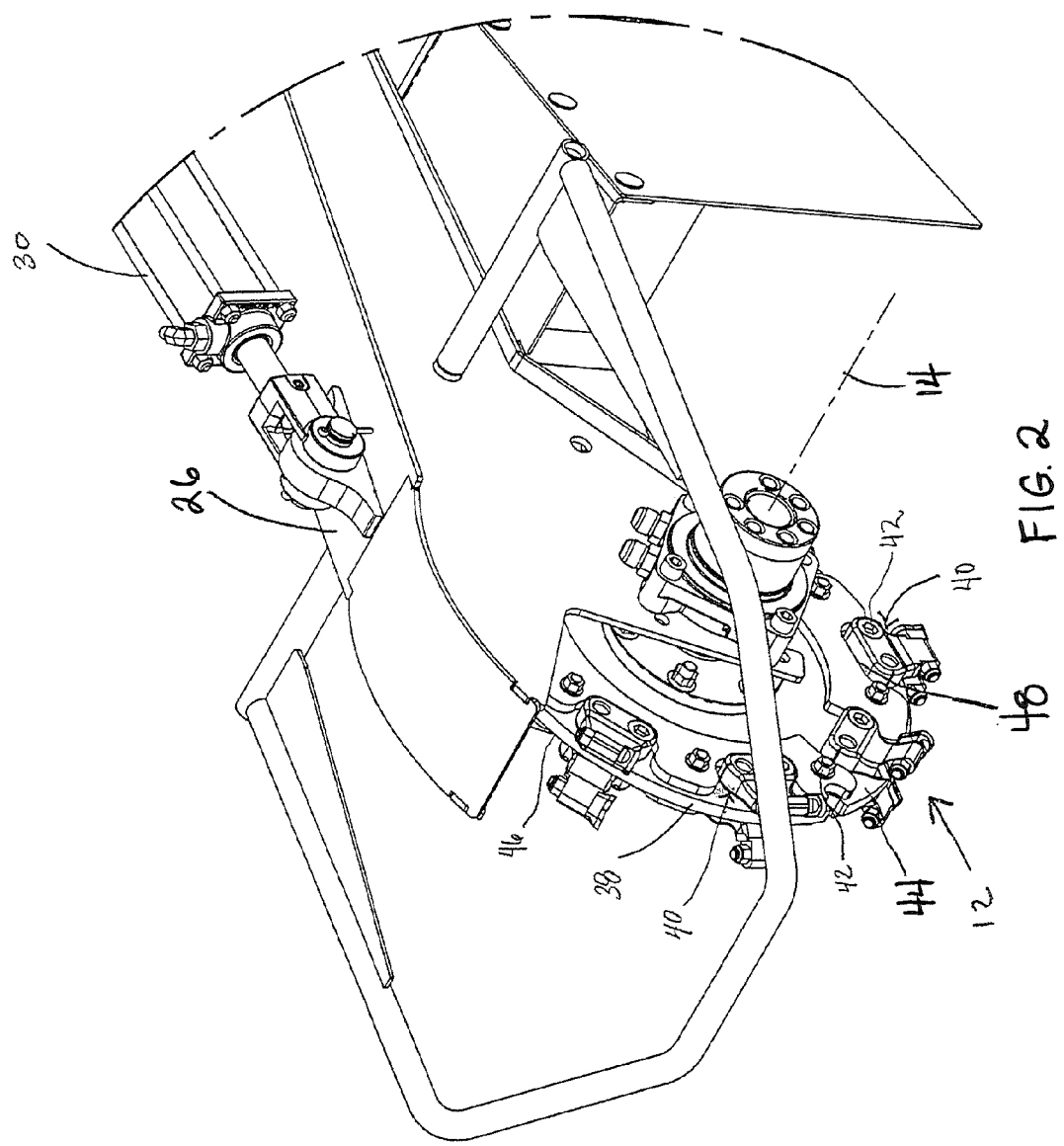
FIG. 2 is an enlarged view of the portion of the self-propelled stump cutter and stump cutter cutting wheel shown in FIG. 1.

FIG. 2 illustrates an enlarged portion of FIG. 1 showing the stump cutter cutting wheel 12. The stump cutter cutting wheel 12 includes a wheel structure 38, multiple cutter assemblies 40, and fasteners 42. The wheel structure 38 has a left side 44 and a right side 46 and may be rotated about the horizontal axis 14 that extends through the wheel structure 38 between the left and right sides 44, 46. The left and right sides 44, 46 of the wheel structure 38 define multiple receiving areas (or "receptacles") 48. The receptacles 48 may have a measured depth in an orientation that extends along the horizontal axis 14. The wheel structure 38 includes multiple cutter assemblies 40 that are mounted and secured thereon using the fasteners 42. The cutter assemblies 40 are illustrated and described in more detail with reference to FIGS. 3-5.

Figure 3:
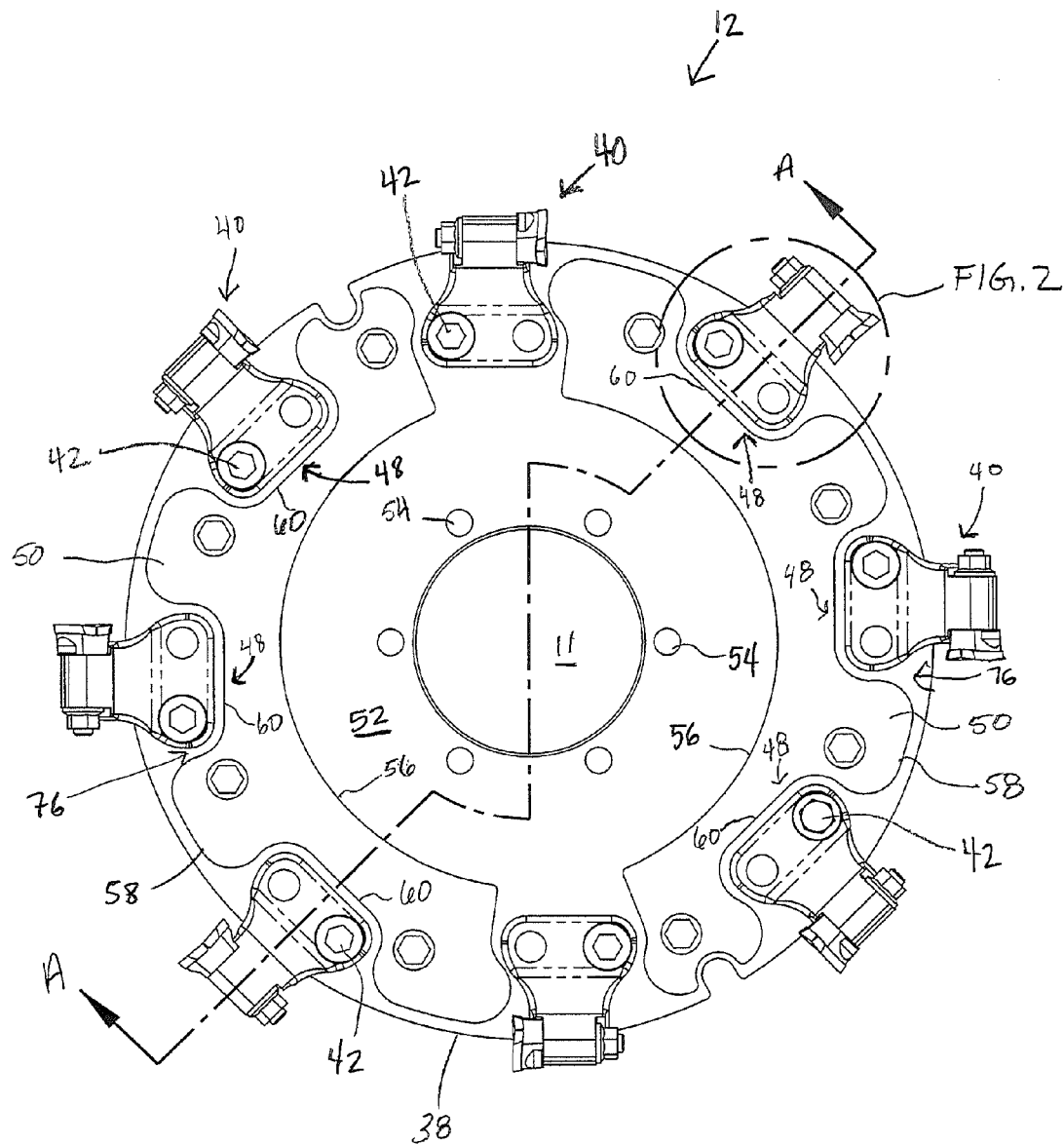
FIG. 3 is a side perspective view of the stump cutter cutting wheel shown in FIG. 1.
Figure 4:
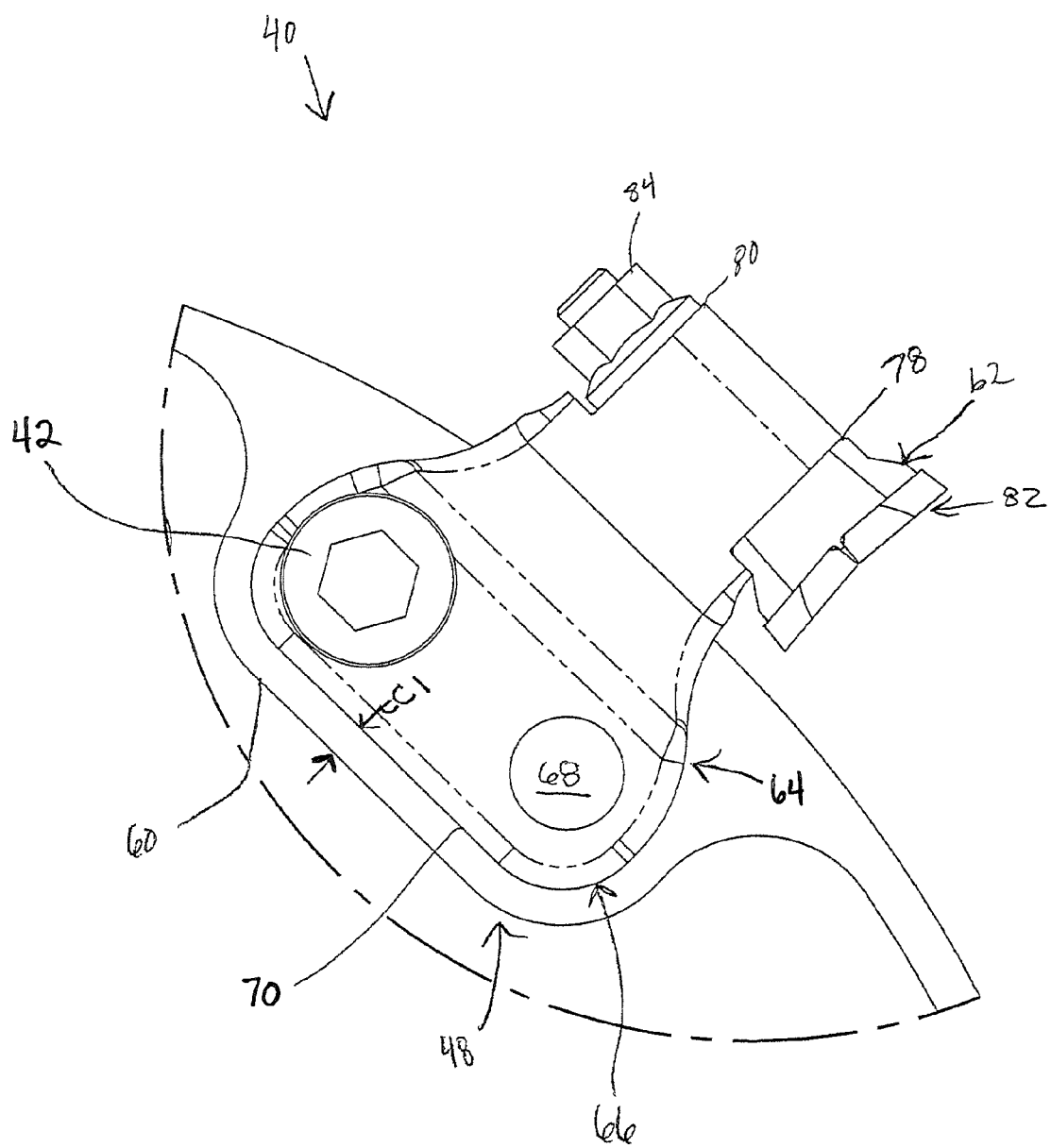
FIG. 4 is an enlarged view of a cutter assembly shown in FIG. 3.
Figure 5:
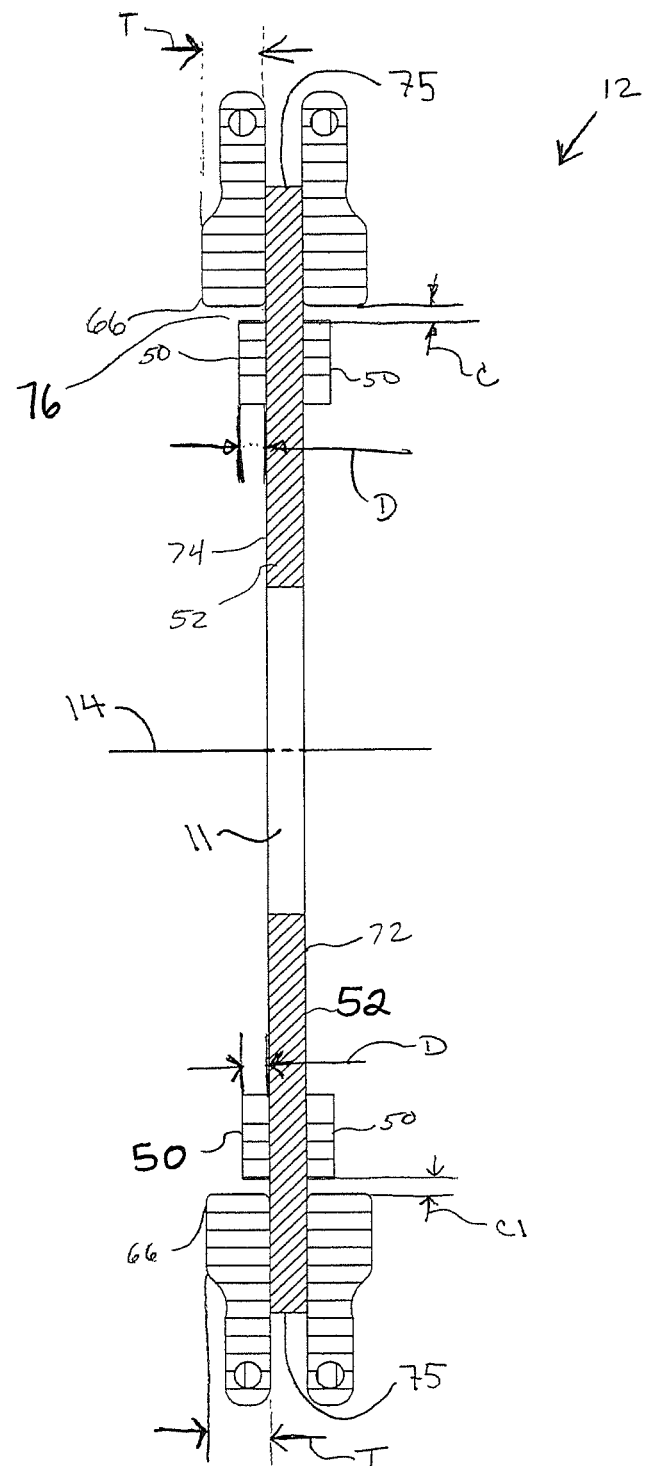
FIG. 5 is a cross-sectional view of the stump cutter cutting wheel shown in FIG. 3 taken along line A-A.

FIGS. 3-5 illustrate features of the stump cutter cutting wheel 12.

FIG. 3. is a side view of the stump cutter cutting wheel 12. In this example, the stump cutter cutting wheel 12 includes guard plates 50, a main wheel 52 and bolts 54 for attaching the stump cutter cutting wheel 12 to the drive motor 32. The cutting wheel 12 defines an opening 11 for receiving the drive motor 32 that is attached to the boom 26. It is to be understood that the features shown in FIG. 3 are also depicted on the opposite side of the stump cutter cutting wheel 12 such that both left and right 44, 46 of the wheel structure 38 are representative of each other. The left and right 44, 46 sides may each include at least two guard plates 50.

The guard plates 50 shown in FIG. 3 are fastened to the main wheel 52 with fasteners 42. In an example, the guard plates 50 may have a thickness of between about 0.5 to 0.25 inches. The guard plates 50 each have a first side 56 and a second side 58. The second sides 58 of the guard plates 50 define multiple receptacles 48 positioned around the periphery of the guard plates 50. The receptacles 48 define receptacle outlines 60. It is to be understood that the receptacle outlines 60 may be configured in various shapes.

FIG. 4 is an enlarged view of a portion of FIG. 3 depicting the cutter assemblies 40. The cutter assemblies 40 include cutters 62 that are configured to mount to cutter holders 64. The cutter holders 64 include base portions 66 that fit within the receptacles 48. The base portions 66 define at least one opening 68 for receiving the fastener 42. The guard plates 50 are mounted to the stump cutter cutting wheel structure 38 such that the cutter holders 64 are recessed into the stump cutter cutting wheel 12. In this example, the design of the guard plates 40 help to eliminate the amount of debris that is thrown from the stump cutter cutting wheel 12.

Turning to FIG. 5, a cross-sectional view is shown of the stump cutter cutting wheel 12. The base portions 66 define a base thickness T that can be measured in the orientation that extends along the horizontal axis 14. In an example, the base thickness T can be between 1.0 and 0.5 inches. In this example, the receptacles 48 may have a depth D of at least 0.25 times as large as the base thickness such that no more than 75 percent of base thickness extends laterally outside of the receptacles 48. In other embodiments, the receptacle depth may be at least 0.30 times as large as the base thickness such that no more than 70 percent of the base thickness extends laterally outside of the receptacles 48. In another embodiment, the receptacle depth may be at least 0.35 times as large as the base thickness such that no more than 65 percent of the base thickness extends laterally outside of the receptacles 48. Still, in other embodiments the receptacle depth may be at least 0.40 times as large as the base thickness such that no more than 60 percent of the base thickness extends laterally outside of the receptacles 48 or be at least 0.45 times as large as the base thickness such that no more than 55 percent of the base thickness extends laterally outside of the receptacles 48.

The base portions 66 define base portion outlines 70 (FIG. 4). Generally, the receptacle outlines 60 may follow the overall shape of the base portion outlines 70. In this example, a majority of the receptacle outlines 60 have a clearance C1 of at least 0.2 inches with respect to the base portion outlines 70. It is to be understood that the clearance may vary in other embodiments according to the disclosure.

In accordance with another aspect of the disclosure, the main wheel 52 of the stump cutter cutting wheel 12 has a left surface 72, a right surface 74, and an outermost border 75 (a border that is furthest from the horizontal axis 14). In this example, the stump cutter cutting wheel 12 includes a left guard mounted to the left surface 72 and a right guard mounted to the right surface 74. The left and right guards each include at least one guard plate. The left and right guards may cover outer annular regions of the left and right surfaces 72, 74 of the main wheel 52. The outer annular regions may extend around the horizontal axis 14. In other embodiments, the left and right guards may not cover inner annular regions of the left and right surfaces 72, 74 of the main wheel 52. In other embodiments, the left and right guards cover 20-60 percent of the total areas defined by the left and right surfaces 72, 74 of the main wheel 52.

In this example, the left and right guards each include first and second plates that cooperate to cover the outer annular regions. The first and second plates may have a semi-circular shape. It is understood that the shape of the plates may vary. The left and right guards define openings 76 that partially define the receptacles 48. The openings 76 can be notches having open sides that face radially outwardly from the horizontal axis 14.

Referring again to FIG. 4, the cutter holders 64 may have leading sides 78 and trailing sides 80. The cutter holders 64 may include cutter fastener openings that extend through the cutter holders 64 from the leading sides 78 to the trailing sides 80. The cutters 62 include cutting heads 82 positioned at the leading sides 78 of the cutter holders 64 and fasteners 84 of the cutters 62 extend through the cutter fastener opening.

In accordance with another aspect of the disclosure, the receptacles 48 may have an inner and outer end and a depth that extends from the inner end to the outer end. The depth may be measured in an orientation that extends along the horizontal axis 14 of the main wheel 52. The inner ends may be closed by the left and right surfaces 72, 74 of the main wheel 52, and the outer ends may be open.

From the forgoing detailed description, it will be evident that modifications and variations can be made without departing from the spirit and scope of the disclosure.

What is claimed is:

1. A stump cutter cutting wheel comprising:
   a wheel structure having a main wheel with a left side and a right side and respective left and right surfaces, the wheel structure being rotatable about a central axis that extends through the wheel structure between the left and right sides, a left guard mounted to the left surface of the left side of the wheel structure and a right guard mounted to the right surface of the right side of the wheel structure, the left and right guards defining openings that at least partially define a plurality of receptacles having receptacle depths measured in an orientation that extends along the central axis;
   a plurality of cutter assemblies mounted to the wheel structure, the cutter assemblies including cutters mounted to cutter holders, the cutter holders including base portions that fit within the receptacles, the base portions each defining at least one fastener opening, the base portions defining base thicknesses measured in the orientation that extends along the central axis, the receptacle depths being at least 0.25 times as large as the base thicknesses such that no more than 75 percent of the base thicknesses extend laterally outside of the receptacles; and
   fasteners for securing the cutter holders to the wheel structure, the fasteners extending through the fastener openings defined by the base portions of the cutter holders;
   wherein the left and right guards each include at least one guard plate, and wherein the guard plates are fastened to the main wheel by fasteners.

2. The stump cutter cutting wheel of claim 1, wherein the receptacle depths are at least 0.30 times as large as the base thicknesses such that no more than 70 percent of the base thicknesses extend laterally outside of the receptacles.

3. The stump cutter cutting wheel of claim 1, wherein the receptacle depths are at least 0.35 times as large as the base thicknesses such that no more than 65 percent of the base thicknesses extend laterally outside of the receptacles.

4. The stump cutter cutting wheel of claim 1, wherein the receptacle depths are at least 0.40 times as large as the base thicknesses such that no more than 60 percent of the base thicknesses extend laterally outside of the receptacles.

5. The stump cutter cutting wheel of claim 1, wherein the receptacle depths are at least 0.45 times as large as the base thicknesses such that no more than 55 percent of the base thicknesses extend laterally outside of the receptacles.

6. The stump cutter cutting wheel of claim 1, wherein the receptacles define receptacle outlines, wherein the base portions define base portion outlines, and wherein a majority of each receptacle outline has a clearance of at least 0.2 inches with respect to the base portion outline of a corresponding one of the base portions.

7. The stump cutter cutting wheel of claim 1, wherein the left and right guards each include at least two guard plates.

8. The stump cutter cutting wheel of claim 1, wherein the openings are notches having open sides that face radially outwardly from the central axis.

9. The stump cutter cutting wheel of claim 1, wherein the left and right guards cover outer annular regions of the left and right surfaces of the main wheel, and wherein the outer annular regions extend around the central axis.

10. The stump cutter cutting wheel of claim 9, wherein the left and right guards do not cover inner annular regions of the left and right surfaces of the main wheel.

11. The stump cutter cutting wheel of claim 1, wherein the left and right guards cover 20-60 percent of the total areas defined by the left and right surfaces of the main wheel.

12. The stump cutter cutting wheel of claim 11, wherein the left and right surfaces of the main wheel are defined between inner and outer diameters of the main wheel.

13. The stump cutter cutting wheel of claim 9, wherein the left and right guards each include first and second plates that cooperate to cover the outer annular regions.

14. The stump cutter cutting wheel of claim 13, wherein the first and second plates are each generally semi-circular.

15. The stump cutter cutting wheel of claim 1, wherein the cutter holders have holder portions that project outwardly from the base portions.

16. The stump cutter cutting wheel of claim 15, wherein the cutter holders have leading sides and trailing sides, wherein cutter fastener openings extend through the cutter holders from the leading sides to the trailing sides, wherein cutting heads of the cutters are positioned at the leading sides of the cutter holders and fasteners of the cutters extend though the cutter fastener openings.

17. A stump cutter cutting wheel comprising:
    a main wheel having a left side and a right side with respective left and right surfaces, the main wheel being rotatable about a central axis that extends through the main wheel between the left and right surfaces;
    guard structures mounted to the respective left and right surfaces of the main wheel, the guard structures being formed by plates fastened to the main wheel by fasteners, the plates defining openings that define receptacles, each plate defining at least two given openings for defining receptacles, the receptacles having inner and outer ends, the receptacles having depths that extend from the inner ends to the outer ends of the receptacles, the depths being measured in an orientation that extends along the central axis of the main wheel, the inner ends being closed by the left and right surfaces of the main wheel and outer ends being open;
    a plurality of cutter assemblies including cutters mounted to cutter holders, the cutter holders including base portions that fit within the receptacles, the base portions each defining at least one fastener opening; and
    fasteners for securing the cutter holders to the main wheel, the fasteners extending through the fastener openings defined by the base portions of the cutter holders and engaging the main wheel.

18. A cutting wheel, comprising:
    a main wheel rotatable about a center axis; the main wheel having a generally planar left surface, a generally planar right surface, and an outermost border; the left surface being generally parallel to the right surface;
    a plurality of cutter assemblies extending from the main wheel beyond the outermost border, each cutter assembly having a base portion and a cutter configured for reducing a tree stump;
    first and second guards comprising respective first and second guard plates, the first and second guard plates each extending a distance D1 from the respective left and right surface, the distance D1 being measured in an orientation that extends along the center axis, the first guard plate defining a first receiving area within the distance D1, and the second guard plate defining a second receiving area within the distance D1;

wherein one of the cutter assembly base portions is positioned in the first receiving area and extends a distance D2 from the left surface, the distance D2 being measured in the orientation that extends along the center axis;

wherein the distance D1 is at least 25% as large as the distance D2; and wherein the guard plates are fastened to the wheel by fasteners.

19. The cutting wheel of claim 18, wherein the first receiving area defines a receptacle outline that follows a shape of at least part of the cutter assembly base portion positioned in the first receiving area.

20. A cutting wheel, comprising:

a main wheel rotatable about a center axis; the main wheel having a generally planar left surface on a left side, a generally planar right surface on a right side, and an outermost border; the left surface being generally parallel to the right surface;

a plurality of cutter assemblies extending from the main wheel beyond the outermost border, each cutter assembly having a base portion and a cutter configured for reducing a tree stump;

a left guard, comprising first and second guard plates each guard plate extending a distance D1 from the left surface, the distance D1 being measured in an orientation that extends along the center axis, the first guard plate defining a first receiving area within the distance D1, the second guard plate defining a second receiving area within the distance D1, a third receiving area being defined within the distance D1 between the first and second guard plates;

wherein one of the cutter assembly base portions is positioned in the first receiving area, another one of the cutter assembly base portions is positioned in the second receiving area, and still another one of the cutter assembly base portions is positioned in the third receiving area;

wherein the cutter assembly base portions in the first, second, and third receiving areas each extend a distance D2 from the left surface; the distance D2 being measured in the orientation that extends along the center axis; and wherein the distance D1 is at least 25% as large as the distance D2; and wherein the first and second guard plates are fastened to the main wheel by fasteners.

21. A stump cutter cutting wheel comprising:

a wheel structure having a left side and a right side, the wheel structure being rotatable about a central axis that extends through the wheel structure between the left and right sides, the wheel structure defining an outermost border and concordant outer annular regions associated with the left and right sides of the wheel structure;

a plurality of right guards carried on the right side of the wheel structure positioned on the outer annular region of the right side, each right guard defining at least one right guard opening, each right guard opening facing radially outwardly from the central axis, the plurality of right guards together covering at least 20% of a total area of the right side;

a plurality of left guards carried on the left side of the wheel structure positioned on the outer annular region of the left side, each left guard defining at least one left guard opening, each left guard opening that facing radially outwardly from the central axis, the plurality of left guards together covering at least 20% of a total area of the left side, the right guard openings and the left guard openings together defining a plurality of receptacles;

a plurality of cutter assemblies mounted to the wheel structure, the cutter assemblies including cutters mounted to cutter holders, the cutter holders including base portions that fit correspondingly within the receptacles, the cutter holders including base portions that fit within the receptacles, the base portions each defining at least one fastener opening, the base portions defining base thicknesses measured in the orientation that extends along the central axis, the receptacle depths being at least 0.25 times as large as the base thicknesses such that no more than 75 percent of the base thicknesses extend laterally outside of the receptacles, the base portions each defining at least one fastener opening; and fasteners for securing the cutter holders to the wheel structure, the fasteners extending through the fastener openings defined by the base portions of the cutter holders wherein the right guards and the left guards are attached to the wheel structure by fasteners.

22. The stump cutter wheel of claim 21, wherein the plurality of right guards together cover up to 60% of a total area of the right side, and the plurality of left guards together cover up to 60% of a total area of the left side.

* * * * *